(No Model.)
T. A. CHURCHILL.
FARM GATE.
No. 484,568. Patented Oct. 18, 1892.
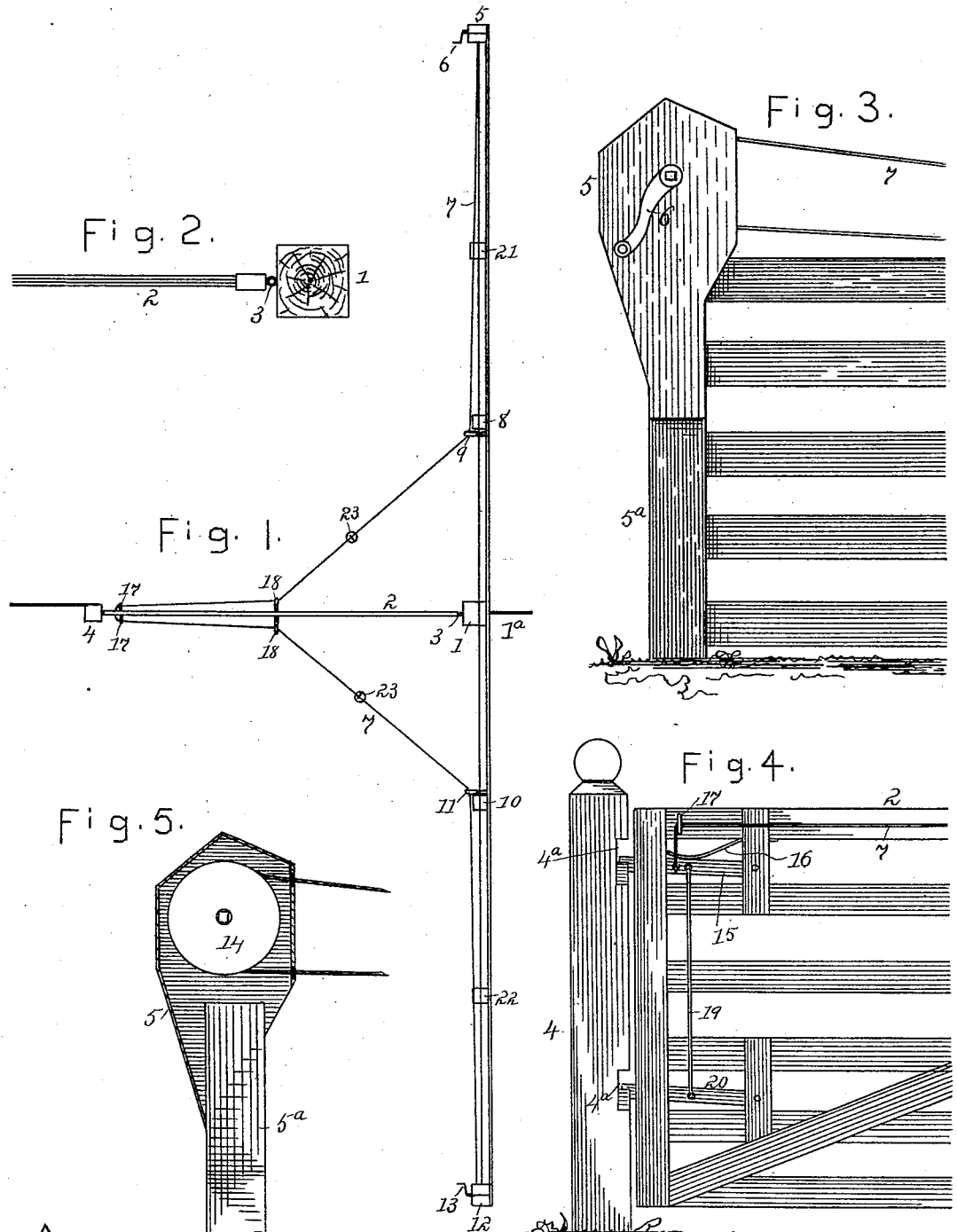
Attest.
Helen Graham
William Graham
Inventor
Thomas A. Churchill
by his attorney
L. P. Graham

UNITED STATES PATENT OFFICE.

THOMAS A. CHURCHILL, OF DELAND, ILLINOIS.

FARM-GATE.

SPECIFICATION forming part of Letters Patent No. 484,568, dated October 18, 1892.

Application filed February 12, 1892. Serial No. 421,236. (No model.)

*To all whom it may concern:*

Be it known that I, THOMAS A. CHURCHILL, of Deland, in the county of Piatt and State of Illinois, have invented certain new and useful Improvements in Farm-Gates, of which the following is a specification.

This invention relates to farm-gates which may be opened and closed without dismounting, opening away from the team in a noiseless manner; and it consists in the details of construction and combination of parts hereinafter set forth and claimed.

In the drawings accompanying and forming a part of this specification, Figure 1 is a plan showing the disposition of the different parts of my device. Fig. 2 is a plan of the post on which the gate is hinged, showing the manner of hinging the gate thereto. Fig. 3 is an elevation of a post carrying a pulley-box. Fig. 4 is an elevation of an end of the gate, showing the way the latches are operated. Fig. 5 is a vertical section through a pulley-box.

The main post 1 is suitably braced and it sustains the gate 2, hinged at 3 to swing both ways. The post 4 is cut away at 4ª to form catches for the latches of the gate. Post 5ª sustains pulley-box 5, in which is placed a pulley 14, as seen in Fig. 5. The shaft of the pulley has a crank 6, by means of which it (the pulley) is rotated. Pulley-box 12 is similarly provided with a pulley, and such pulley has the crank 13. The line 7 runs around the pulleys and connects at its different ends with opposite sides of the gate, passing through eyes or pulley-blocks 9 and 11 on posts 8 and 10, through eyes 17 and 18 on the gate about the middle of its length, and finally terminating at latch 15. Spring 16 bears against latch 15 with sufficient force to overcome the normal tension of the line and so ordinarily cause the latch to engage the catches of the posts. Latch 20 is auxiliary to latch 15, holding the lower part of the gate against lateral displacement, and it connects with such latch by means of link 19. The posts 21 and 22 are each provided with catches, the same as post 4, in order that the gate may be held open when desired. The line is provided with weights 23, which take up the slack when the gate is open.

In operation the team is driven up in front of the gate, a crank is turned in a direction to swing the gate away from the team, the latches are raised, the gate swings open without rattle or jar and catches on a side post, the team is driven through the gate-opening, and the crank on the opposite side is turned in a similar manner to close the gate. The manipulation is easy, the team is not frightened by the noise or motion of the gate, and there is but little wear of the mechanism.

The line connects the two pulleys in such manner that the gate is under perfect control from both sides when either crank is manipulated, and the gate may be partly opened and then closed by simply turning the crank first in one direction and then in the other. This peculiarity is of utility in driving stock on horseback, as the rider may open the gate sufficiently to permit an individual animal to pass, then close the gate without dismounting, and return for others.

I claim—

A swinging gate hinged to swing both ways and having latches held depressed by spring-pressure, posts on opposite sides of the gate, crank-axles on said posts, and pulleys on said axles, posts between the crank-axle posts and the gate, having guides thereon, guides on both sides of said gate about half-way of its length, and a line connecting the pulleys on the crank-axles independently of the gate-post and extending, also, from said pulleys through the guides of the intermediate posts, and thence to the two guides on the sides of the gate and having both ends secured to the latch thereof, all in combination, substantially as set forth.

In testimony whereof I sign my name in the presence of two subscribing witnesses.

THOMAS A. CHURCHILL.

Attest:
E. S. MCDONALD,
L. P. GRAHAM.